(12) United States Patent
Lee et al.

(10) Patent No.: US 9,293,988 B2
(45) Date of Patent: Mar. 22, 2016

(54) CURRENT MODE PWM BOOST CONVERTER WITH FREQUENCY DITHERING

(71) Applicant: SAMSUNG ELECTRONICS CO., LTD., Suwon-si (KR)

(72) Inventors: KyoungJin Lee, Seoul (KR); Hyoungseok Oh, Seoul (KR); Jehyung Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 14/086,256

(22) Filed: Nov. 21, 2013

(65) Prior Publication Data

US 2014/0159686 A1 Jun. 12, 2014

(30) Foreign Application Priority Data

Dec. 11, 2012 (KR) .................. 10-2012-0143733

(51) Int. Cl.
*H02M 3/156* (2006.01)
*H02M 1/00* (2007.01)

(52) U.S. Cl.
CPC ...... *H02M 3/156* (2013.01); *H02M 2001/0025* (2013.01)

(58) Field of Classification Search
CPC .............. H02M 3/156; H02M 2001/0025; H02M 3/1582; H02M 1/44
See application file for complete search history.

(56) References Cited

U.S. PATENT DOCUMENTS

| | | | |
|---|---|---|---|
| 6,791,306 B2 | 9/2004 | Walters et al. | |
| 6,833,693 B2* | 12/2004 | Andrews | H02M 3/157 323/288 |
| 7,026,800 B2 | 4/2006 | Liu et al. | |
| 7,378,822 B2 | 5/2008 | Liao | |
| 8,193,793 B2 | 6/2012 | Kumagai et al. | |
| 9,166,471 B1* | 10/2015 | Levesque | H02M 1/44 |
| 2003/0142519 A1 | 7/2003 | Walters et al. | |
| 2004/0076024 A1 | 4/2004 | Liu et al. | |
| 2007/0108947 A1 | 5/2007 | Liao | |
| 2009/0315523 A1 | 12/2009 | Kumagai et al. | |
| 2010/0194371 A1 | 8/2010 | Satou et al. | |
| 2011/0101932 A1 | 5/2011 | Nakazono | |
| 2011/0316511 A1 | 12/2011 | Wang et al. | |
| 2012/0194227 A1* | 8/2012 | Lin et al. | 327/113 |
| 2013/0038313 A1 | 2/2013 | Gotoh | |

FOREIGN PATENT DOCUMENTS

| | | |
|---|---|---|
| JP | 2011-199942 A | 10/2011 |
| JP | 2012-80755 A | 4/2012 |
| JP | 2012-100392 A | 5/2012 |
| KR | 10-2005-0065952 A | 6/2005 |
| KR | 10-2009-0026946 A | 3/2009 |
| KR | 10-1026984 B1 | 4/2011 |
| KR | 10-1116779 B1 | 2/2012 |

OTHER PUBLICATIONS

Robert Sheehan. Understanding and Applying Current-Mode Control Theory. Oct. 31, 2007. pp. 1-30. Republished by Texas Insturments as SNVA555.*

* cited by examiner

*Primary Examiner* — Harry Behm
*Assistant Examiner* — Peter Novak
(74) *Attorney, Agent, or Firm* — Sughrue Mion, PLLC

(57) ABSTRACT

A current mode PWM converter configured to maintain a duty ratio of a driving signal for driving a boost circuit boosting an input voltage to an output voltage when a frequency of a clock signal for generating the driving signal is varied.

12 Claims, 8 Drawing Sheets

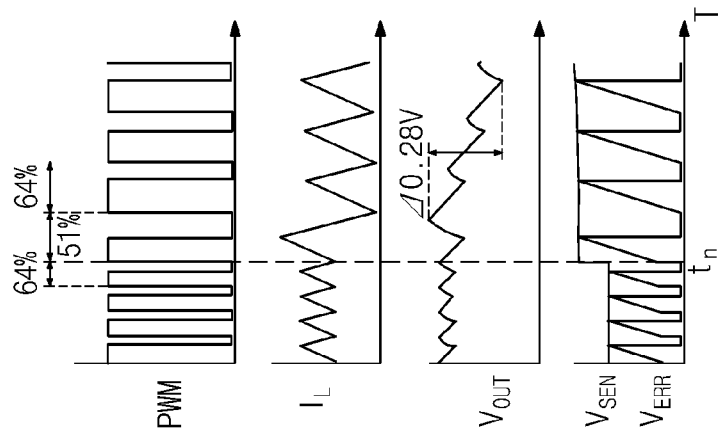
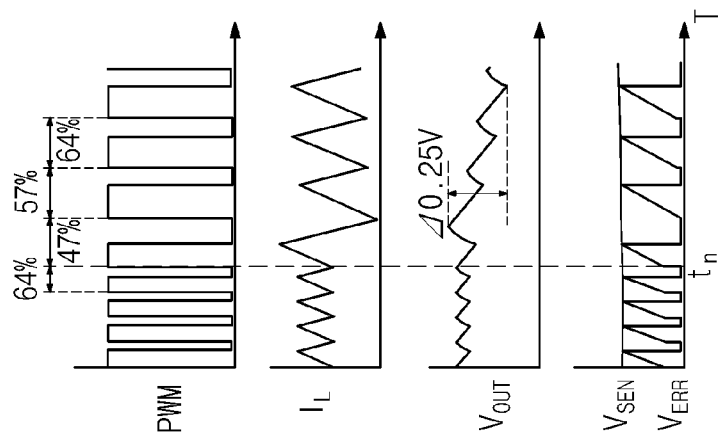
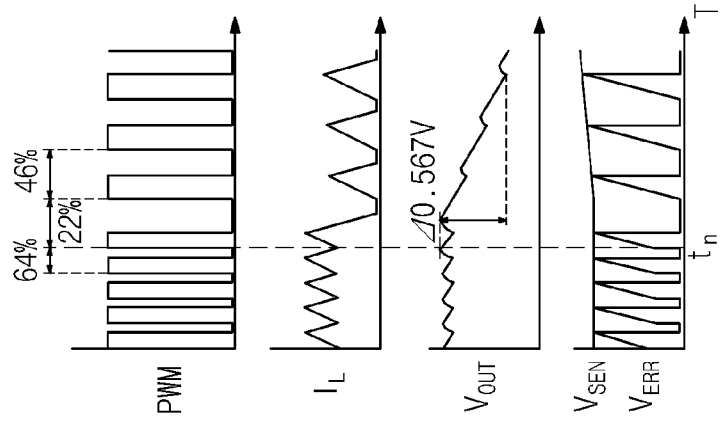

US 9,293,988 B2

CURRENT MODE PWM BOOST CONVERTER WITH FREQUENCY DITHERING

CROSS-REFERENCE TO RELATED APPLICATIONS

This application claims priority under 35 U.S.C. §119 from Korean Patent Application No. 10-2012-0143733 filed on Dec. 11, 2012, in the Korean Intellectual Property Office, the disclosure of which is hereby incorporated by reference in its entirety.

BACKGROUND

Devices consistent with exemplary embodiments relate to a current mode pulse width modulation (PWM) boost converter.

Voltage converters may be divided into two types. A first type may be an AC-DC converter to convert an AC voltage to a DC voltage. A second type may be a DC-DC converter to convert a DC voltage to an AC voltage. In general, the AC-DC converter is mainly used. However, use of the DC-DC converter has gradually increased.

The DC-DC converter may receive a constant DC voltage to output a constant DC voltage having a level different from a level of the input DC voltage. At this time, the DC-DC converter may be referred to as a boosting converter when an output voltage is higher than an input voltage and as a buck converter when an output voltage is lower than an input voltage.

SUMMARY

According to an aspect of an exemplary embodiment, there is provided a current mode PWM converter including a boost circuit configured to receive an input voltage, and boost the input voltage to an output voltage, the boost circuit comprising an inductor and a switch configured to control flow of a current flowing through the inductor; a pseudo random clock generating unit configured to generate a clock signal, and vary a frequency of the clock signal; a voltage divider configured to receive the output voltage, and divide the output voltage to a division voltage; a reset signal generating circuit configured to generate a reset signal based on the division voltage and the current flowing through the boost inductor; and a driving signal generating circuit configured to receive the clock signal and the reset signal, and generate a driving signal of the switch based on the clock signal and the reset signal, the driving signal having a low-to-high transition corresponding to a low-to-high transition of the clock signal and having a high-to-low transition corresponding to a low-to-high transition of the reset signal wherein in response to the pseudo random clock generating unit varying the frequency of the clock signal from a first frequency of the clock signal to a second frequency of the clock signal, the reset signal generating circuit controls activation time of the reset signal by varying a frequency of the clock signal such that a duty ratio of the driving signal based on the first frequency of the clock signal is substantially equal to a duty ratio of the driving signal based on the second frequency of the clock signal.

The activation time of the reset signal is reduced if the frequency of the clock signal decreases from a high frequency to a low frequency and the activation time of the reset signal increases if the frequency of the clock signal increases from a low frequency to a high frequency.

The reset signal generating circuit includes an error amplifier configured to compare the division voltage and a reference voltage, and to generate an error signal based on a result of comparing the division voltage and the reference voltage; a feedback signal generating circuit configured to add a slope compensation ramp signal and a sensing signal obtained through sensing of the current flowing through the inductor to generate a feedback signal based on a result of adding the slope compensation ramps signal and the sensing signal; and a comparator configured to compare the error signal and the feedback signal, and to output the reset signal based on a result of comparing the error signal and the feedback signal. Here, a slope of the slope compensation ramp signal varies according to variation of the frequency of the clock signal.

The feedback signal generating circuit decreases the slope of the slope compensation ramp signal if the frequency of the clock signal decreases from a high frequency to a low frequency and increases the slope of the slope compensation ramp signal if the frequency of the clock signal increases from a low frequency to a high frequency.

The feedback signal generating circuit includes an inductor current generating unit configured to sense the current flowing through the inductor, and to output the sensing signal based on the current flowing through the inductor; a slope compensation ramp generating unit configured to generate the slope compensation ramp signal based on the clock signal, and vary the slope of the slope compensation ramp signal according to the variation of the frequency of the clock signal; and an adder configured to add the sensing signal and the slope compensation ramp signal, and to generate the feedback signal based on a result of adding sensing signal and the slope compensation ramp signal.

The pseudo random clock generating unit includes a pseudo random code generator configured to generate a pseudo random code; and a clock generator configured to generate the pseudo random clock signal having a frequency varied according to the pseudo random code generated by the pseudo random code generator.

The slope compensation ramp generating unit varies the slope of the slope compensation ramp signal according to the random code upon which the frequency of the clock signal is varied.

The reset signal generating circuit includes a feedback signal generating circuit configured to add a slope compensation ramp signal and a sensing signal obtained through sensing of the current flowing through the inductor, and to generate a feedback signal based a result of adding the slope compensation ramp signal and the sensing signal; an error amplifier configured to compare the division voltage and a reference voltage, and to generate an error signal based on a result of comparing the division voltage and the reference voltage; an error signal compensation circuit configured to vary a voltage level of the error signal according to variation of the frequency of the clock signal, to generate a compensation error signal; and a comparator configured to compare the compensation error signal and the feedback signal, and to output the reset signal based on a result of comparing the compensation error signal and the feedback signal.

The feedback signal generating circuit includes an inductor current generating unit configured to sense the current flowing through the inductor, and to output the sensing signal based on the current flowing through the inductor; a slope compensation ramp generating unit configured to generate the slope compensation ramp signal based on to the clock signal; and an adder configured to add the sensing signal and the slope compensation ramp signal, and to generate the feedback signal based on a result of adding sensing signal and the slope compensation ramp signal.

The error signal compensation circuit increases the voltage level of the error signal if the frequency of the clock signal is decreased from a high frequency to a low frequency and decreases the voltage level of the error signal if the frequency of the clock signal is increased from a low frequency to a high frequency.

According to an aspect of an exemplary embodiment, there is provided a current mode PWM converter including a boost circuit configured to receive an input voltage, and boost the input voltage to an output voltage, the boost circuit comprising an inductor and a switch configured to control flow of a current flowing through the inductor; a voltage divider configured to receive the output voltage, and divide the output voltage to a division voltage; an error amplifier configured to compare the division voltage and a reference voltage, and to generate an error signal based on a result of comparing the division voltage and the reference voltage; a pseudo random clock generating unit configured to generate a clock signal, and vary a frequency of the clock signal; a feedback signal generating circuit configured to add a slope compensation ramp signal and a sensing signal obtained through sensing of the current flowing through the inductor to generate a feedback signal based on a result of adding the slope compensation ramps signal and the sensing signal; a comparator configured to compare the error signal and the feedback signal, and to output a reset signal based on a result of comparing the error signal and the feedback signal; and a driving signal generating circuit configured to generate a driving signal for driving the switch in response to the clock signal and the reset signal output by the comparator. Here, a slope of the slope compensation ramp signal is varied according to the variation of the frequency of the clock signal.

The feedback signal generating circuit decreases the slope of the slope compensation ramp signal if the frequency of the clock signal decreases from a high frequency to a low frequency and increases the slope of the slope compensation ramp signal if the frequency of the clock signal increases from a low frequency to a high frequency.

A duty ratio of the driving signal prior to frequency variation of the clock signal by the pseudo random clock generating unit and a duty ratio of the driving signal after the frequency variation of the clock signal by the pseudo random clock generating unit is substantially maintained by immediately variation of the frequency of the clock signal to the slope of the slope compensation ramp signal.

According to an aspect of an exemplary embodiment, there is provided a current mode PWM converter including a boost circuit configured to receive an input voltage, and boost the input voltage to an output voltage, the boost circuit comprising an inductor and a switch configured to control flow of a current flowing through the inductor; a pseudo random clock generating unit configured to generate a clock signal, and vary a frequency of the clock signal; a voltage divider configured to receive the output voltage, and divide the output voltage to a division voltage; an error amplifier configured to compare the division voltage and a reference voltage, and to generate an error signal based on a result of comparing the division voltage and the reference voltage; an error signal compensation circuit configured to vary a voltage level of the error signal according to variation of the frequency of the clock signal; a feedback signal generating circuit configured to add a slope compensation ramp signal and a sensing signal obtained through sensing of the current flowing through the inductor, and to generate a feedback signal based a result of adding the slope compensation ramp signal and the sensing signal; a comparator configured to compare an output of the error signal compensation circuit and the feedback signal; and a driving signal generating circuit configured to generate a driving signal for driving the switch based on the clock signal and an output of the comparator.

The error signal compensation circuit increases a voltage level of the error signal if the frequency of the pseudo random clock signal is decreased from a high frequency to a low frequency and decreases a voltage level of the error signal if the frequency of the clock signal is increased from a low frequency to a high frequency.

BRIEF DESCRIPTION OF THE FIGURES

The above and other aspects will become apparent from the following description with reference to the following figures, wherein like reference numerals refer to like parts throughout the various figures unless otherwise specified, and wherein:

FIGS. 7A to 7C are diagrams illustrating simulation results before and after an adaptive feed-forward compensation technique is applied.

DETAILED DESCRIPTION OF EXEMPLARY EMBODIMENTS

Figure 1:
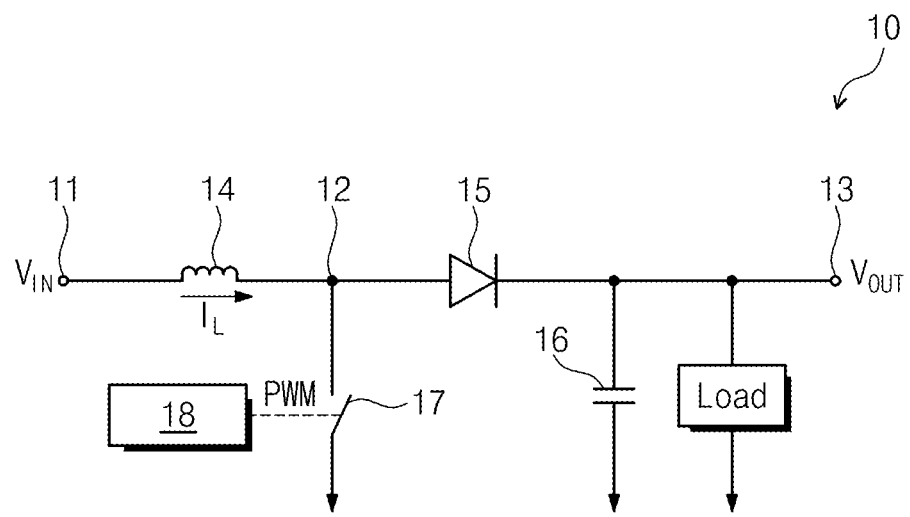
FIG. 1 is a diagram schematically illustrating a basic structure of a boost converter.

Exemplary embodiments will be described in detail with reference to the accompanying drawings. The exemplary embodiments, however, may be embodied in various different forms, and should not be construed as being limited only to the illustrated embodiments. Rather, these exemplary embodiments are provided as examples so that this disclosure will be thorough and complete, and will fully convey the concept of the disclosure to those skilled in the art. Accordingly, known processes, elements, and techniques are not described with respect to some of the exemplary embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this disclosure is directed. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a diagram schematically illustrating a basic structure of a boost converter. A boost converter 10 may receive a source voltage $V_{IN}$ and output a DC voltage $V_{OUT}$ higher than the source voltage $V_{IN}$. The boost converter 10 may include an inductor 14 connected in series between an input terminal 11 receiving the source voltage $V_{IN}$ and a node 12, a diode 15 having an input connected to the node 12 and an output connected to an output terminal 13 outputting the output DC voltage $V_{OUT}$, a switch 17 connected between the node 12 and a ground, a control module 18 configured to control an on/off state of the switch 17 and to control a duty ratio of the boost converter 10 as the control result, and a capacitor 16 to smooth the output voltage $V_{OUT}$. It is well understood that a basic structure illustrated in FIG. 1 is variously changed.

In an operation of the boost converter 10, an input energy may be stored at the inductor 14 when the switch 17 is closed during a duty ratio proportion of a pulse period, and may be released to the output terminal 13 through the forward biased diode 15 when the switch 17 is open during the remainder of the pulse period. When the switch 17 is closed, the diode 15 may be reverse biased and prevent current flowing back from a load and the capacitor 16 to a ground.

In recent years, as the use of mobile devices, such as a smart phone, a tablet PC, etc., increases efficient power management is increasingly required. For this reason, a power management integrated chip (PMIC) is important. Also, a display panel applied to each product may become large-scaled and while requiring high quality. In this light, the PMIC may be important to minimize power consumption and to improve efficiency. Since a display panel requires a high driving voltage and a power with high power efficiency, switching regulators (e.g., charge pump, PWM DC-DC converter, etc.) may be used, not a linear regulator such as a conventional LDO (low-Dropout).

Since the PWM DC-DC converter performs a switching operation, a sub-harmonic noise according to each frequency and noises due to each parasitic component may be problematic. Conventional methods used to minimize such noise problems may be a method of lowering a slew of a switching transition period, a method of selecting a switching frequency having a less influence on a system, a method of connecting snubbers at dv/dt nodes, and a method of minimizing di/dt current loops. A method of efficiently lowering a noise level with a low cost when the noise problems are not largely improved through the above-described methods may be an SSFD (Spread Spectrum Frequency Dithering) technique. The SSFD technique applied to a boost converter (e.g., control module 18) of FIG. 1 as a PWM DC-DC converter may randomly switch a switching frequency such that a noise power is distributed to a peripheral frequency of a conventional switching frequency. As a result, an overall peak noise level may be lowered through the SSFD technique.

This technique of lowering a noise level by randomly switching a frequency may be problematic in that a voltage ripple is generated when a frequency is switched. If a frequency is changed, an average inductor current may vary. At this time, undershoot or overshoot may be generated, so that a voltage ripple increases. This will be more fully described with reference to FIGS. 2A and 2B.

Figure 2A:
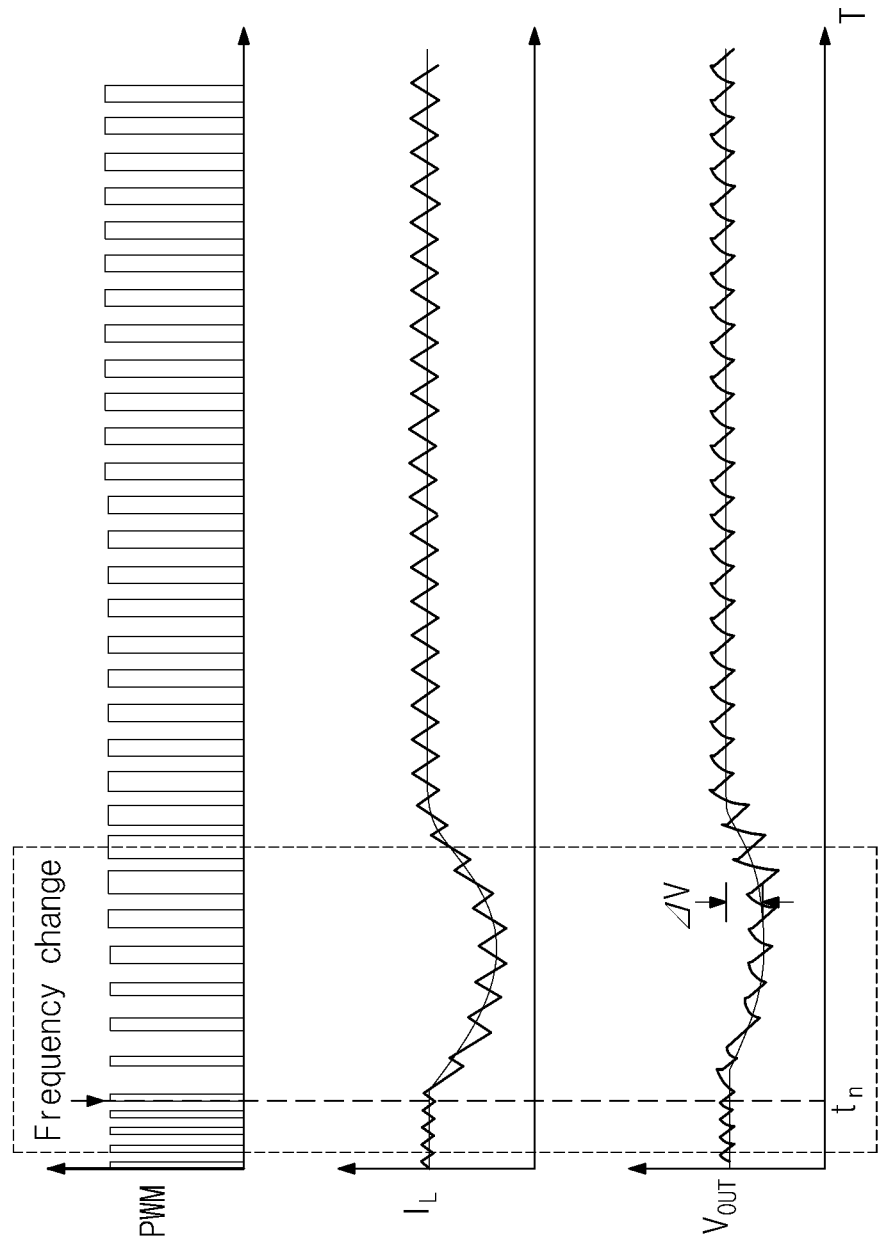
FIG. 2A is a diagram illustrating the influence of a variation in a switching frequency on a regulation characteristic of an output voltage at a boost converter to which an SSFD technique is applied.
Figure 2B:
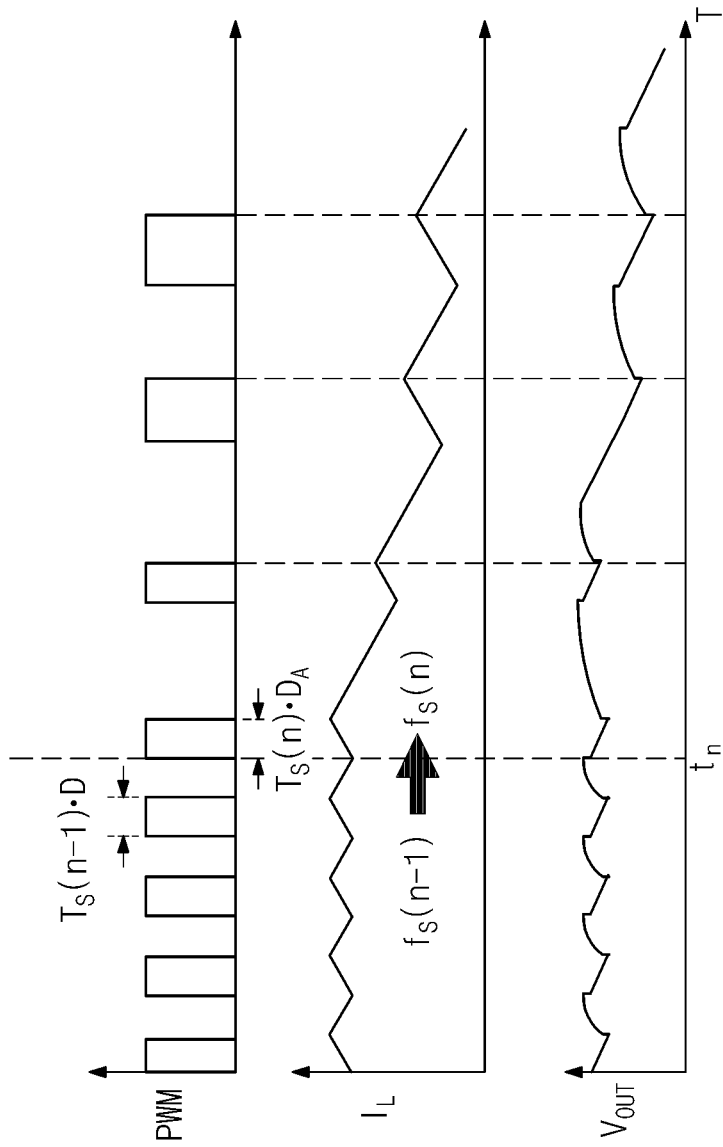
FIG. 2B is an exploded view of FIG. 2A.

FIG. 2A is a diagram illustrating the influence of a variation in a switching frequency on a regulation characteristic of an output voltage at a boost converter to which an SSFD technique is applied. FIG. 2B is an expanded view of a portion of FIG. 2A that is shown within dotted lines in FIG. 2A.

As illustrated in FIG. 2A, it is assumed that a switching frequency is changed from fs(n−1) to fs(n) lower than fs(n−1) at time $t_n$. If reaching a steady state, duty ratios D may be equal to each other before and after time $t_n$. However, at a transition period, as illustrated in FIG. 2B, an on-time period $(T_S \cdot (n-1)D \approx T_S(n) \cdot D_A)$ will maintain a previous state even after frequency changing due to a feedback loop, so that a duty ratio is changed $(D \rightarrow D_A)$. That is, a ratio of an on-time to an off-time at a switching cycle, that is, a duty ratio may get out of a steady state while the on-time is maintained at a transition period. As a result, power may not be released from an inductor to an output terminal. In this case, an undershoot ripple $\Delta V$ may be generated at an output voltage, as illustrated in FIG. 2A, so that a voltage regulation characteristic is deteriorated. According to an exemplary embodiment, a variation in a regulation characteristic of an output voltage generated when a switching frequency is changed may be suppressed, as discussed below—.

Figure 3:
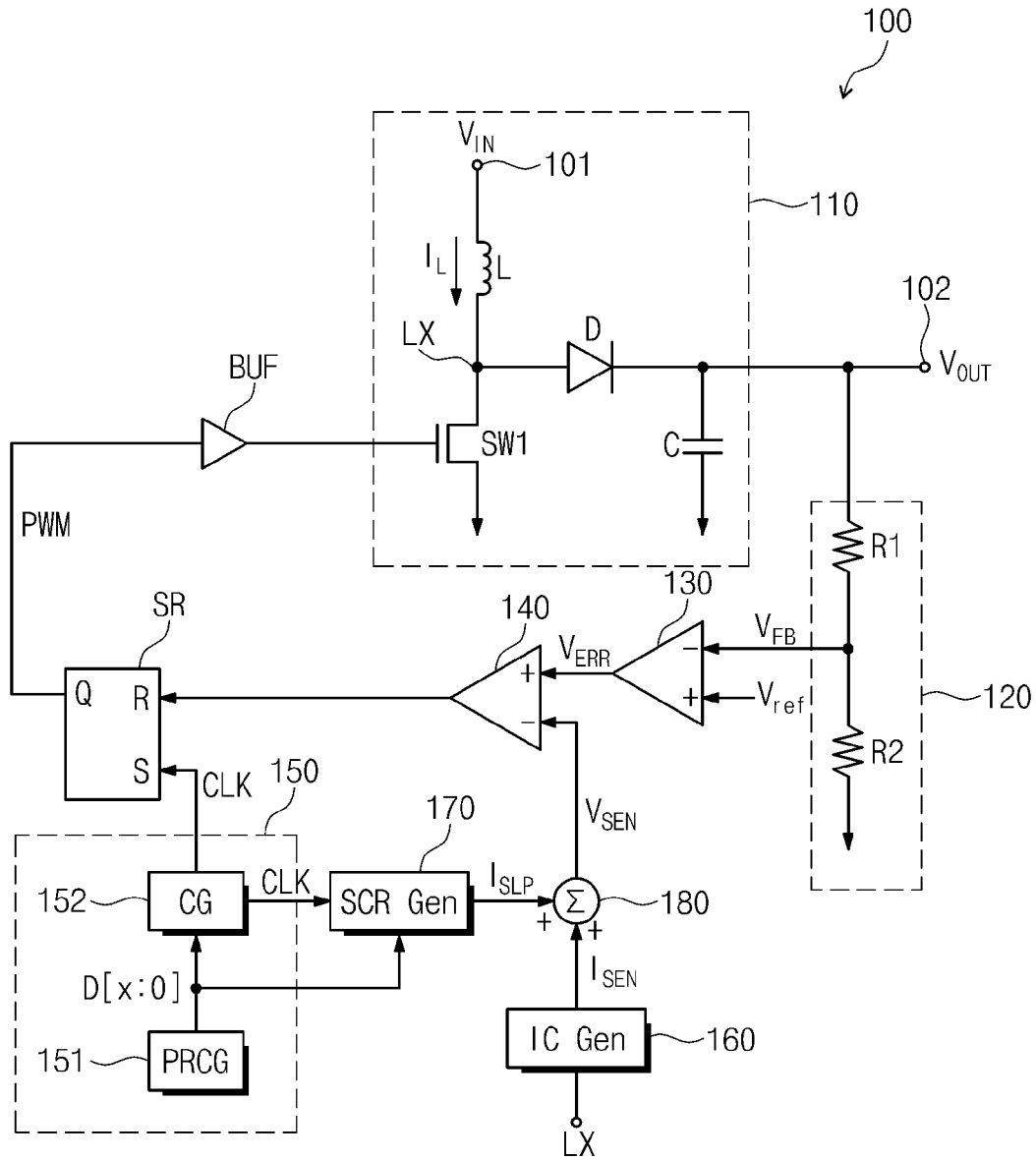
FIG. 3 is a block diagram schematically illustrating a current mode PWM boost converter according to an exemplary embodiment.

FIG. 3 is a block diagram schematically illustrating a current mode PWM boost converter according to an exemplary embodiment. A current mode PWM boost converter 100 according to the exemplary embodiment may be used to supply power to a display device, a handheld phone, a camera, a PDA, a calculator, a notebook computer, and similar electronic products.

Referring to FIG. 3, the current mode PWM boost converter 100 may include a boost circuit 110, a voltage divider 120, an error amplifier 130, a comparator 140, a pseudo random clock generating unit 150, an inductor current generating unit 160, a slope compensation ramp generating unit 170, an adder 180, an SR flip-flop SR, and a buffer BUF.

The boost circuit 110 may boost an input voltage $V_{IN}$ to generate a high DC output voltage. The boost circuit 110 may include a boost inductor L, a MOS transistor SW1, a rectification diode D, and an output capacitor C. When the MOS transistor SW1 is turned on, the rectification diode D may be reverse biased. At this time, a current may flow through the boost inductor L and the MOS transistor SW1 such that a voltage of the boost inductor L increases. However, a current may linearly increase, not instantly flow through the boost inductor L and form an electromagnetic field. When the MOS transistor SW1 is turned on, an output current may be provided by the output capacitor C. When the MOS transistor SW1 is turned off, the boost inductor L may not store energy, so that the electromagnetic field stored at the boost inductor L is discharged. A voltage polarity of the boost inductor L may be inverted such that boost inductor L discharges stored energy to the output capacitor C, and a voltage of a node (i.e., node LX) of the rectification diode D connected to the boost inductor L may become higher than the input voltage $V_{IN}$. This energy may provide a load current, and may again charge the output capacitor C.

The voltage divider 120 may include resistors R1 and R2 connected in series between an output terminal 102 and a ground. A division voltage $V_{FB}$ may be output from a tap (i.e., a node connecting the resistors R1 and R2) of the voltage divider 120, and may be transferred to a negative input terminal (−) of the error amplifier 130. The error amplifier 130 may compare the division voltage $V_{FB}$ with a reference voltage Vref provided to a positive input terminal (+).

The error amplifier 130 may output an error signal $V_{ERR}$ obtained by amplifying a voltage difference between the division voltage $V_{FB}$ and the reference voltage $V_{ref}$. For example, if the division voltage $V_{FB}$ input to the negative input terminal (−) is lower than the reference voltage $V_{ref}$ input to the positive input terminal (+), the error signal $V_{ERR}$ may increase according to a voltage difference. If the division voltage $V_{FB}$ input to the negative input terminal (−) is higher than the reference voltage $V_{ref}$ input to the positive input terminal (+), the error signal $V_{ERR}$ may decrease according to a voltage difference.

The comparator 140 may compare the error signal $V_{ERR}$ and the feedback signal $V_{SEN}$. An output of the comparator 140 and a clock signal CLK output from a pseudo random clock generating unit 150 may be provided to reset R and set S terminals and of the SR flip-flop SR. A driving signal generated by the SR flip-flop SR may be provided to a gate of the MOS transistor SW1 through the buffer BUF to adjust a conduction time of the MOS transistor SW1 (i.e., to adjust a pulse duration of the driving signal PWM) and to adjust a DC output voltage $V_{OUT}$. The driving signal PWM may have a low-to-high transition in synchronization with a low-to-high transition of the clock signal CLK provided to the set terminal S, and may have a high-to-low transition synchronized with a low-to-high transition of a comparator output provided to the reset terminal R. That is, a duty ratio (or, an on-time/high-level period) of the driving signal PWM may be determined based on a time when the clock signal CLK transitions from a low level to a high level and a time when the feedback signal $V_{SEN}$ reaches the error signal $V_{ERR}$.

The pseudo random clock generating unit 150 may generate the clock signal CLK provided to the set terminal S of the SR flip-flop SR. A period (or, frequency) of the clock signal CLK may be randomly changed. The pseudo random clock generating unit 150 may include a pseudo random code generator (in FIG. 3, marked by PRCG) 151 to generate a random code D[x:0] and a clock generator (in FIG. 3, marked by CG) 152 to generate the clock signal CLK having a period (or, frequency) varied according to the random code D[x:0]. A period of the clock signal CLK may be varied according to the random code D[x:0] generated by the pseudo random code generator 151. That is, a switching frequency of the MOS transistor SW1 may be changed. This, as described above, may lower an overall peak noise level by randomly changing a switching frequency to distribute a noise power.

The inductor current generating unit 160 may be connected to the node LX of the boost circuit 110, and may sense the inductor current $I_L$ to generate a sensing current $I_{SEN}$. For example, the inductor current generating unit 160 may sense the inductor current $I_L$ flowing through the boost inductor L during an on-time period of the driving signal PWM, and may output the sensing current $I_{SEN}$ according to the sensing result. The slope compensation ramp generating unit 170 may receive the clock signal CLK and the random code D[x:0] from the pseudo random clock generating unit 150 to generate a slope compensation ramp signal $I_{SLP}$. In an exemplary embodiment, a slope of the slope compensation ramp signal $I_{SLP}$ may be changed according to the random code D[x:0]. When the random code D[x:0] indicates a variation of a switching frequency from a high frequency to a low frequency, the slope of the slope compensation ramp signal $I_{SP}$ may decrease. When the random code D[x:0] indicates a variation of a switching frequency from a low frequency to a high frequency, the slope of the slope compensation ramp signal $I_{ap}$ may increase. The slope compensation ramp signal $I_{SLP}$ and the sensing current $I_{SEN}$ may be added by the adder 180 to generate the feedback signal $V_{SEN}$.

With a feed-forward slope compensation technique where a variation in a switching frequency is instantly reflected to the slope compensation ramp signal $I_{SLP}$, it is possible to improve a transition characteristic. For example, it is possible to offset a variation in an average inductor current due to a frequency variation by immediately reflecting the frequency variation to an on-duty variation. As a result, it is possible to reduce deterioration of a regulation characteristic of an output voltage. In other words, a duty ratio of a steady state may be maintained by immediately applying a frequency variation to the slope compensation ramp signal $I_{SLP}$ without a long stabilization time due to a low feedback loop bandwidth limited by a system cutoff frequency. Thus, it is possible to instantly stabilize a regulation characteristic at a frequency variation.

In an exemplary embodiment, the error amplifier 130, the comparator 140, the inductor current generating unit 160, the slope compensation ramp generating unit 170, and the adder 180 may constitute a reset signal generating circuit which generates a reset signal applied to the reset terminal R of the SR flip-flop SR based on the division voltage $V_{FB}$ and a current flowing through the boost inductor L. The SR flip-flop SR and the buffer BUF may form a driving signal generating circuit which generates a driving signal PWM for driving the switch SW1 in response to the pseudo random clock signal CLK and the reset signal. An on-time period of the driving signal PWM may be decided by activation (e.g., low-to-high transition) of the pseudo random clock signal CLK and activation (e.g., low-to-high transition) of the reset signal. The inductor current generating unit 160, the slope compensation ramp generating unit 170, and the adder 180 may constitute a feedback signal generating circuit which generates the feedback signal $V_{SEN}$ by adding the slope compensation ramp signal $I_{SLP}$ and the sensing signal $I_{SEN}$ obtained through sensing of an inductor current flowing through the boost inductor L.

Figure 4:
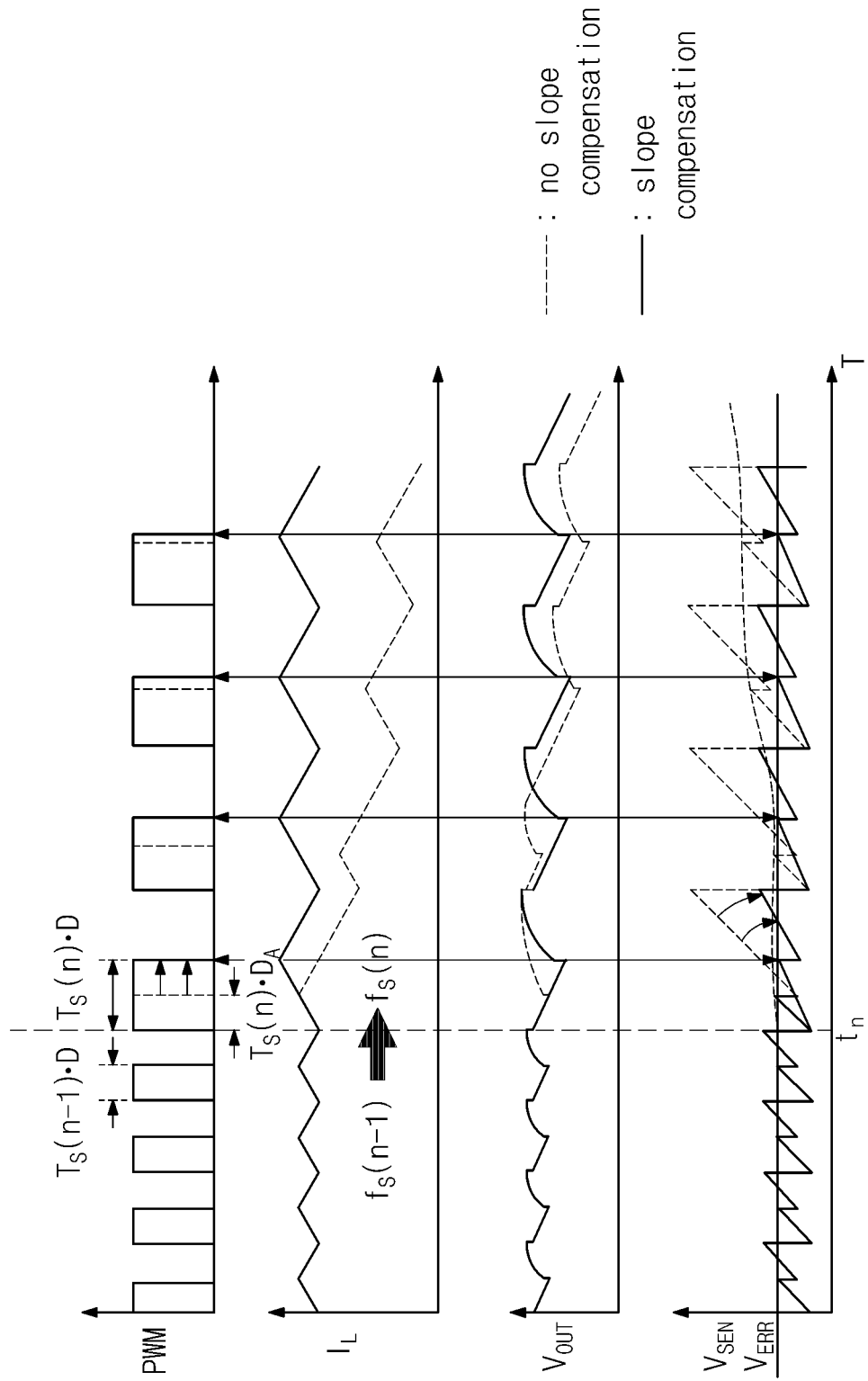
FIG. 4 is a diagram schematically illustrating an operation of a current mode PWM boost converter of FIG. 3.

FIG. 4 is a diagram schematically illustrating an operation of a current mode PWM boost converter of FIG. 3.

As illustrated in FIG. 4, a duty ratio of a driving signal PWM may be $T_S$ (N−1)·D before time $t_n$, that is, before a frequency of a clock signal CLK generated by a clock generator 152 according to a switching frequency (or, random code D[x:0]) is changed. In case of a steady state, an inductor current $I_L$ may iteratively increase and decrease according to turn-on and turn-off states of a MOS transistor SW1 controlled by the driving signal PWM. In this case, an output voltage $V_{OUT}$ may be stably maintained.

If a frequency of the clock signal CLK generated by the clock generator 152 according to a switching frequency (or, random code D[x:0]) is changed from fs(n−1) to fs(n) (fs(n−1)>fs(n)) on the basis of $t_n$, a slope compensation ramp generating unit 170 may change a slope of a slope compensation ramp signal $I_{SLP}$ according to the changed random code D[x:0]. For example, when a switching frequency is changed from a high frequency to a low frequency, the slope compensation ramp generating unit 170 may decrease a slope of the slope compensation ramp signal $I_{SLP}$ according to the changed random code D[x:0]. Thus, a time when a peak level of a feedback signal $V_{SEN}$ reaches a voltage level of an error signal $V_{ERR}$ becomes longer. That is, a reset point of time of an SR flip-flop SR may slow according to a variation in the switching frequency, so that a duty ratio of the driving signal PWM increases.

It is possible to prevent the inductor current $I_L$ from being sharply reduced by increasing a duty ratio of the driving signal PWM when the switching frequency is changed from a high frequency to a low frequency. As a slope of the slope compensation ramp signal $I_{SLP}$ is changed instantly according to a variation in the switching frequency, a duty ratio of a steady state may be maintained to be the same as the duty ratio of the steady state before a variation in the switching frequency.

In summary, a slope of the slope compensation ramp signal $I_{SLP}$ may be changed to be proportional to a frequency under the assumption that K(n) and K(n−1) (K indicating a slope variation) all maintain more than 0.5 avoiding sub-harmonic oscillation. That is, a point of time when a feedback signal VSEN reaches an error signal $V_{ERR}$ before the error signal $V_{ERR}$ is changed by a feedback loop may slow by reducing a value of K in proportion to a decrease in a frequency. As a result, it is possible to maintain duty ratios before and after a frequency variation equally. This may be expressed by the following equation.

$$K(n) = \left(\frac{f_s(n)}{f_s(n-1)}\right) \cdot K(n-1)$$

In the event that a slope of the slope compensation ramp signal $I_{SLP}$ is not varied at a variation in the switching frequency (e.g., the above-described feed-forward slope compensation manner is not applied to a current mode PWM converter), as illustrated by a dotted line of FIG. 4, a time when a peak level of the feedback signal $V_{SEN}$ reaches a voltage level of the error signal $V_{ERR}$ may be maintained to be the same as before a variation in the switching frequency. In this case, compared with a duty ratio of a driving signal PWM before a variation in the switching frequency, a duty ratio of a driving signal PWM after a variation in the switching frequency may gradually increase through feedback loops. This may cause a decrease in the inductor current $I_L$, so that the output voltage $V_{OUT}$ is lowered. On the other hand, a duty ratio of a steady state may be maintained to be the same as before a variation in the switching frequency by varying a slope of the slope compensation ramp signal $I_{SLP}$ immediately according to a variation in the switching frequency.

Although not show in figures, if a switching frequency (i.e., a frequency of the clock signal CLK generated by a clock generator 152 according to a random code D[x:0]) is changed from fs(n−1) to fs(n) (fs(n−1)<fs(n)) on the basis of any point of time, a slope compensation ramp generating unit 170 may change a slope of a slope compensation ramp signal $I_{SLP}$ according to the changed random code D[x:0]. For example, when a switching frequency is changed from a low frequency to a high frequency, the slope compensation ramp generating unit 170 may increase a slope of the slope compensation ramp signal $I_{SLP}$ according to the changed random code D[x:0]. Thus, a time when a peak level of a feedback signal $V_{SEN}$ reaches a voltage level of an error signal $V_{ERR}$ becomes shorter. That is, a reset point of time of an SR flip-flop SR may quicken according to a variation in the switching frequency, so that a duty ratio of the driving signal PWM decreases.

Figure 5:
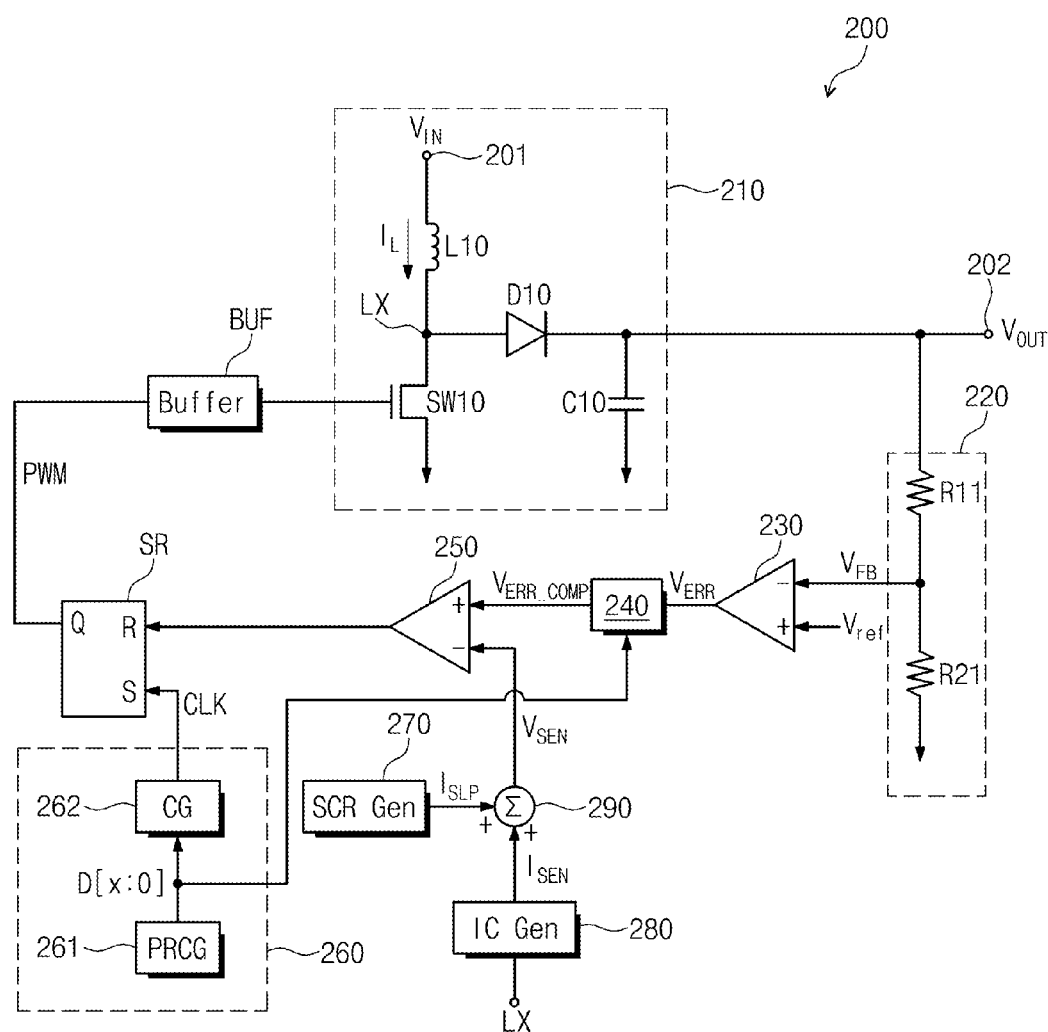
FIG. 5 is a block diagram schematically illustrating a current mode PWM boost converter according to another exemplary embodiment.

FIG. 5 is a block diagram schematically illustrating a current mode PWM boost converter according to another exemplary embodiment. Referring to FIG. 5, a current mode PWM boost converter 200 may include a boost circuit 210, a voltage divider 220, an error amplifier 230, a compensation circuit (or, an error signal compensation circuit) 240, a comparator 250, a pseudo random clock generating unit 260, a slope compensation ramp generating unit 270, an inductor current generating unit 280, an adder 290, an SR flip-flop SR, and a buffer BUF. In FIG. 5, the components 210, 220, 250, 260, 280, 290, SR, and BUF may be substantially the same as those in FIG. 3, and a description thereof is thus omitted.

The compensation circuit 240 may vary a voltage level of an error signal $V_{ERR}$ output from the error amplifier 230 in response to a random code D[x:0] generated from a pseudo random code generator 261. The random code D[x:0] provided to the compensation circuit 240 may be used as information indicating a variation in a switching frequency. The compensation circuit 240 may vary a voltage level of the error signal $V_{ERR}$ to be inversely proportional to a frequency variation. For example, when the switching frequency is changed from a high frequency to a low frequency, the compensation circuit 240 may increase a voltage level of the error signal $V_{ERR}$ according to the changed random code D[x:0]. When the switching frequency is changed from a low frequency to a high frequency, the compensation circuit 240 may decrease a voltage level of the error signal $V_{ERR}$ according to the changed random code D[x:0].

With a feed-forward slope compensation technique in which a variation in a switching frequency is immediately reflected to the error signal $V_{ERR}$, it is possible to improve a transition characteristic. For example, it is possible to offset a variation in an average inductor current due to a frequency variation by immediately reflecting the frequency variation to an on-duty variation. As a result, it is possible to reduce deterioration of a regulation characteristic of an output voltage. In other words, a duty ratio of a steady state may be maintained by immediately applying a frequency variation to the error signal $V_{ERR}$ without a long stabilization time due to a low feedback loop bandwidth limited by a system cutoff frequency. Thus, it is possible to instantly stabilize a regulation characteristic at a frequency variation.

In an exemplary embodiment, the error amplifier 230, the compensation circuit 240, the comparator 250, the inductor current generating unit 280, the slope compensation ramp generating unit 270, and the adder 290 may constitute a reset signal generating circuit which generates a reset signal applied to the reset terminal R of the SR flip-flop SR based on the division voltage $V_{FB}$ and a current flowing through the boost inductor $L_{10}$. The SR flip-flop SR and the buffer BUF may form a driving signal generating circuit which generates a driving signal PWM for driving a switch SW10 in response to the pseudo random clock signal CLK and the reset signal. An on-time period of the driving signal PWM may be decided by activation (e.g., low-to-high transition) of the pseudo random clock signal CLK and activation (e.g., low-to-high transition) of the reset signal. The inductor current generating unit 280, the slope compensation ramp generating unit 270, and the adder 290 may constitute a feedback signal generating circuit which generates the feedback signal $V_{SEN}$ by adding the slope compensation ramp signal $I_{SLP}$ and the sensing signal $I_{SEN}$ obtained through sensing of an inductor current $I_L$ flowing through the boost inductor L10.

Figure 6:
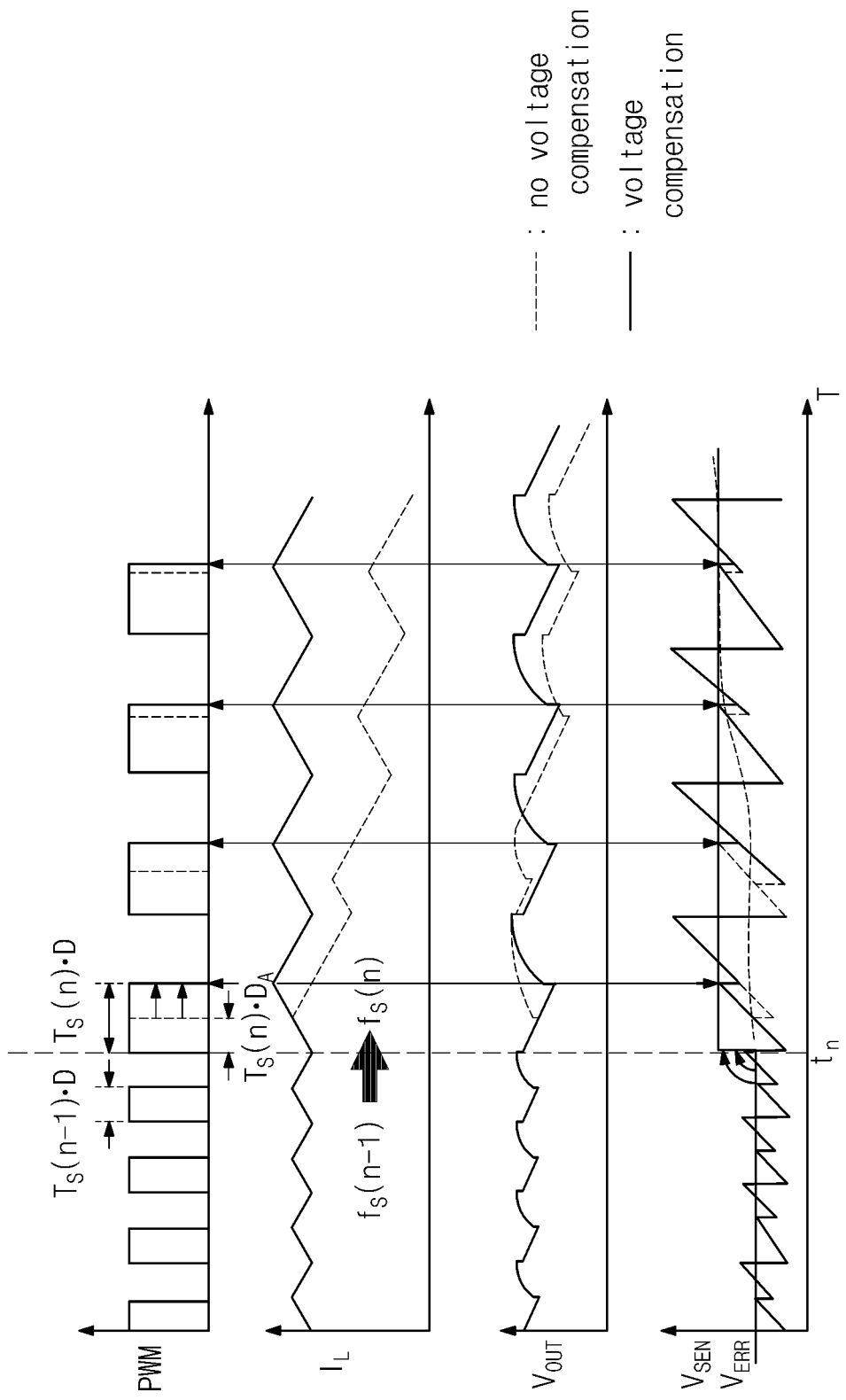
FIG. 6 is a diagram schematically illustrating an operation of a current mode PWM boost converter of FIG. 5.

FIG. 6 is a diagram schematically illustrating an operation of a current mode PWM boost converter of FIG. 5.

As illustrated in FIG. 6, a duty ratio of a driving signal PWM may be $T_S$ (n−1)·D before time $t_n$, that is, before a switching frequency (or, a frequency of a clock signal CLK generated by a clock generator 262 according to a random code D[x:0]) is changed. In case of a steady state, an inductor current $I_L$ may iteratively increase and decrease according to turn-on and turn-off states of a MOS transistor SW10 controlled by the driving signal PWM. In this case, an output voltage $V_{OUT}$ may be stably maintained.

If a switching frequency (or, a frequency of a clock signal CLK generated by a clock generator 262 according to a random code D[x:0]) is changed from fs(n−1) to fs(n) (fs(n−1)>fs(n)) on the basis of $t_n$, a compensation circuit 240 may change a voltage level of an error signal $V_{ERR}$ according to the changed random code D[x:0]. For example, when a switching frequency is changed from a high frequency to a low frequency, the compensation circuit 240 may increase a voltage level of the error signal $V_{ERR}$ according to the changed random code D[x:0]. Thus, a time when a peak level of a feedback signal $V_{SEN}$ reaches a voltage level of an error signal $V_{ERR}$ becomes longer. That is, a reset point of time of an SR flip-flop SR may slow according to a variation in the switching frequency, so that a duty ratio of the driving signal PWM increases.

It is possible to prevent the inductor current $I_L$ from decreasing by increasing a duty ratio of the driving signal PWM when a switching frequency is changed from a high frequency to a low frequency. Thus, a duty ratio of a steady state may be maintained to be the same as before a variation in the switching frequency by immediately changing a voltage level of the error signal VERR according to a variation of the switching frequency. This may mean that generation of a voltage ripple due to a variation in the switching frequency is prevented.

In the event that a voltage level of the error signal $V_{ERR}$ is not varied at a variation in the switching frequency, as illustrated by a dotted line of FIG. 6, a time when a peak level of the feedback signal $V_{SEN}$ reaches a voltage level of the error signal $V_{ERR}$ may be maintained to be the same as before a variation in the switching frequency. In this case, compared with a duty ratio of a driving signal PWM before a variation in the switching frequency, a duty ratio of a driving signal PWM after a variation in the switching frequency may gradually increase. This may cause a decrease in the inductor current $I_L$, so that the output voltage $V_{OUT}$ is lowered.

Although not show in figures, if a switching frequency (i.e., a frequency of the clock signal CLK generated by a clock generator 262 according to a random code D[x:0]) is changed from fs(n−1) to fs(n) (fs(n−1)<fs(n)) on the basis of any point of time, a compensation circuit 240 may change a voltage level of the error signal $V_{ERR}$ according to the changed random code D[x:0]. For example, when a switching frequency is changed from a low frequency to a high frequency, the compensation circuit 240 may decrease a voltage level of the error signal $V_{ERR}$ according to the changed random code D[x:0]. Thus, a time when a peak level of a feedback signal $V_{SEN}$ reaches a voltage level of an error signal $V_{ERR}$ becomes shorter. That is, a reset point of time of an SR flip-flop SR may quicken according to a variation in the switching frequency, so that a duty ratio of the driving signal PWM decreases.

FIGS. 7A to 7C are diagrams illustrating simulation results before and after an adaptive feed-forward compensation technique is applied.

In FIG. 7A, there may be illustrated an inductor current $I_L$, a driving signal PWM, an output voltage $V_{OUT}$, a feedback signal $V_{SEN}$, and an error signal $V_{ERR}$ before and after a frequency change in the event that an adaptive feed-forward compensation technique is not applied. As illustrated in FIG. 7A, an output voltage ripple of 567 mV may be generated when a switching frequency is changed. The reason may be that a duty ratio is decided by a feedback loop. For this reason, a transient response may become slower and a lot of disturbance may be forced to an inductor current. Thus, a large output voltage ripple may be generated.

FIG. 7B illustrates an inductor current $I_L$, a driving signal PWM, an output voltage $V_{OUT}$, a feedback signal $V_{SEN}$, and an error signal $V_{ERR}$ before and after a frequency change in the event that an adaptive feed-forward compensation technique described with reference to FIGS. 3 and 4 is applied. Referring to FIG. 7B, in the event that an adaptive feed-forward compensation technique is applied, a ripple may be reduced by about 55% compared with a case of FIG. 7A.

FIG. 7C illustrates an inductor current $I_L$, a driving signal PWM, an output voltage $V_{OUT}$, a feedback signal $V_{SEN}$, and an error signal $V_{ERR}$ before and after a frequency change in the event that an adaptive feed-forward compensation technique described with reference to FIGS. 5 and 6 is applied. Referring to FIG. 7C, in the event that an adaptive feed-forward compensation technique is applied, an output voltage ripple of 280 mV may be generated when a switching frequency is changed. A ripple may be reduced by about 50% compared with a case of FIG. 7A.

If the adaptive feed-forward compensation technique is applied to a pseudo random SSFD scheme for noise spreading, a feed-forward loop may take action against a frequency changed every moment, and there is a big benefit for a voltage regulation characteristic.

While the disclosure has been described with reference to exemplary embodiments, it will be apparent to those skilled in the art that various changes and modifications may be made without departing from the spirit and scope of the present invention. Therefore, it should be understood that the above exemplary embodiments are not limiting, but illustrative.

What is claimed is:

1. A current mode pulse width modulation (PWM) converter, comprising:
    a boost circuit configured to receive an input voltage, and boost the input voltage to an output voltage, the boost circuit comprising an inductor and a switch configured to control flow of a current flowing through the inductor;
    a pseudo random clock generating unit configured to generate a clock signal, and vary a frequency of the clock signal;
    a voltage divider configured to receive the output voltage, and divide the output voltage to a division voltage;
    a reset signal generating circuit configured to generate a reset signal based on the division voltage and the current flowing through the boost inductor; and
    a driving signal generating circuit configured to receive the clock signal and the reset signal, and generate a driving signal of the switch based on the clock signal and the reset signal, the driving signal having a low-to-high transition corresponding to a low-to-high transition of the clock signal and having a high-to-low transition corresponding to a low-to-high transition of the reset signal,
    wherein in response to the pseudo random clock generating unit varying the frequency of the clock signal from a first frequency of the clock signal to a second frequency of the clock signal, the reset signal generating circuit controls activation time of the reset signal by varying a frequency of the reset signal in direct correlation to the pseudo random clock generating unit varying the frequency of the clock signal from the first frequency of the clock signal to the second frequency of the clock signal such that a duty ratio of the driving signal based on the first frequency of the clock signal is substantially equal to a duty ratio of the driving signal based on the second frequency of the clock signal, and
    wherein the activation time of the reset signal is reduced in direct correlation to the pseudo random clock generating unit varying the frequency of the dock signal from the first frequency of the clock signal to the second frequency of the clock signal if the frequency of the clock signal decreases from a high frequency to a low frequency and the activation time of the reset signal is increased in direct correlation to the pseudo random clock generating unit varying the frequency of the clock signal from the first frequency of the clock signal to the second frequency of the clock signal if the frequency of the clock signal increases from a low frequency to a high frequency.

2. The current mode PWM converter of claim 1, wherein the reset signal generating circuit comprises:
    an error amplifier configured to compare the division voltage and a reference voltage, and to generate an error signal based on a result of comparing the division voltage and the reference voltage;
    a feedback signal generating circuit configured to add a slope compensation ramp signal and a sensing signal obtained through sensing of the current flowing through the inductor to generate a feedback signal based on a result of adding the slope compensation ramps signal and the sensing signal; and
    a comparator configured to compare the error signal and the feedback signal, and to output the reset signal based on a result of comparing the error signal and the feedback signal,
    wherein a slope of the slope compensation ramp signal varies according to variation of the frequency of the clock signal.

3. The current mode PWM converter of claim 2, wherein the feedback signal generating circuit decreases the slope of the slope compensation ramp signal if the frequency of the clock signal decreases from a high frequency to a low frequency and increases the slope of the slope compensation ramp signal if the frequency of the clock signal increases from a low frequency to a high frequency.

4. The current mode PWM converter of claim 3, wherein the feedback signal generating circuit comprises:
    an inductor current generating unit configured to sense the current flowing through the inductor, and to output the sensing signal based on the current flowing through the inductor;
    a slope compensation ramp generating unit configured to generate the slope compensation ramp signal based on the clock signal, and vary the slope of the slope compensation ramp signal according to the variation of the frequency of the clock signal; and
    an adder configured to add the sensing signal and the slope compensation ramp signal, and to generate the feedback signal based on a result of adding sensing signal and the slope compensation ramp signal.

5. The current mode PWM converter of claim 4, wherein the clock generating unit comprises:
    a pseudo random code generator configured to generate a pseudo random code; and
    a clock generator configured to generate the pseudo random clock signal having a frequency varied according to the pseudo random code generated by the pseudo random code generator.

6. The current mode PWM converter of claim 5, wherein the slope compensation ramp generating unit varies the slope of the slope compensation ramp signal according to the random code upon which the frequency of the clock signal is varied.

7. The current mode PWM converter of claim 1, wherein the reset signal generating circuit comprises:
    a feedback signal generating circuit configured to add a slope compensation ramp signal and a sensing signal obtained through sensing of the current flowing through the inductor, and to generate a feedback signal based a result of adding the slope compensation ramp signal and the sensing signal;
    an error amplifier configured to compare the division voltage and a reference voltage, and to generate an error signal based on a result of comparing the division voltage and the reference voltage;
    an error signal compensation circuit configured to vary a voltage level of the error signal according to variation of the frequency of the clock signal, to generate a compensation error signal; and
    a comparator configured to compare the compensation error signal and the feedback signal, and to output the reset signal based on a result of comparing the compensation error signal and the feedback signal.

8. The current mode PWM converter of claim 7, wherein the feedback signal generating circuit comprises:
    an inductor current generating unit configured to sense the current flowing through the inductor, and to output the sensing signal based on the current flowing through the inductor;
    a slope compensation ramp generating unit configured to generate the slope compensation ramp signal based on to the clock signal; and an adder configured to add the sensing signal and the slope compensation ramp signal, and to generate the feedback signal based on a result of adding sensing signal and the slope compensation ramp signal.

9. The current mode PWM converter of claim 8, wherein the error signal compensation circuit increases the voltage level of the error signal if the frequency of the clock signal is decreased from a high frequency to a low frequency and decreases the voltage level of the error signal if the frequency of the clock signal is increased from a low frequency to a high frequency.

10. A current mode PWM converter, comprising:
a boost circuit configured to receive an input voltage, and boost the input voltage to an output voltage, the boost circuit comprising an inductor and a switch configured to control flow of a current flowing through the inductor;
a voltage divider configured to receive the output voltage, and divide the output voltage to a division voltage;
an error amplifier configured to compare the division voltage and a reference voltage, and to generate an error signal based on a result of comparing the division voltage and the reference voltage;
a pseudo random clock generating unit configured to generate a clock signal, and vary a frequency of the clock signal;
a feedback signal generating circuit configured to add a slope compensation ramp signal and a sensing signal obtained through sensing of the current flowing through the inductor to generate a feedback signal based on a result of adding the slope compensation ramps signal and the sensing signal;
a comparator configured to compare the error signal and the feedback signal, and to output a reset signal based on a result of comparing the error signal and the feedback signal; and
a driving signal generating circuit configured to generate a driving signal for driving the switch in response to the clock signal and the reset signal output by the comparator,
wherein a slope of the slope compensation ramp signal is varied in direct correlation to the variation of the frequency of the clock signal, and
wherein the feedback signal generating circuit decreases the slope of the slope compensation ramp signal if the frequency of the clock signal decreases from a high frequency to a low frequency and increases the slope of the slope compensation ramp signal if the frequency of the clock signal increases from a low frequency to a high frequency.

11. The current mode PWM converter of claim 10, wherein a duty ratio of the driving signal prior to frequency variation of the clock signal by the pseudo random clock generating unit and a duty ratio of the driving signal after the frequency variation of the clock signal by the pseudo random clock generating unit is substantially maintained by immediately variation of the frequency of the clock signal to the slope of the slope compensation ramp signal.

12. A current mode PWM converter, comprising:
a boost circuit configured to receive an input voltage, and boost the input voltage to an output voltage, the boost circuit comprising an inductor and a switch configured to control flow of a current flowing through the inductor;
a pseudo random clock generating unit configured to generate a clock signal, and vary a frequency of the clock signal;
a voltage divider configured to receive the output voltage, and divide the output voltage to a division voltage;
an error amplifier configured to compare the division voltage and a reference voltage, and to generate an error signal based on a result of comparing the division voltage and the reference voltage;
an error signal compensation circuit configured to vary a voltage level of the error signal in direct correlation to variation of the frequency of the clock signal;
a feedback signal generating circuit configured to add a slope compensation ramp signal and a sensing signal obtained through sensing of the current flowing through the inductor, and to generate a feedback signal based a result of adding the slope compensation ramp signal and the sensing signal;
a comparator configured to compare an output of the error signal compensation circuit and the feedback signal; and
a driving signal generating circuit configured to generate a driving signal for driving the switch based on the clock signal and an output of the comparator,
wherein the error signal compensation circuit increases a voltage level of the error signal if the frequency of the pseudo random clock signal is decreased from a high frequency to a low frequency and decreases a voltage level of the error signal if the frequency of the clock signal is increased from a low frequency to a high frequency.

* * * * *